United States Patent [19]
Rajner et al.

[11] Patent Number: 5,351,874
[45] Date of Patent: Oct. 4, 1994

[54] METHOD OF JOINING A CERAMIC COMPONENT TO A METAL COMPONENT

[75] Inventors: Walter Rajner, Nürnberg; Peter Stingl, Lauf, both of Fed. Rep. of Germany

[73] Assignee: Hoechst CeramTec AG, Selb, Fed. Rep. of Germany

[21] Appl. No.: 2,501

[22] Filed: Jan. 6, 1993

[51] Int. Cl.⁵ .................. B23K 1/00; B23K 31/02; B23K 103/16
[52] U.S. Cl. .................. 228/124.1; 228/124.6
[58] Field of Search .......... 228/122, 124, 263.12, 228/903; 403/30, 272

[56] References Cited

U.S. PATENT DOCUMENTS

| | | | |
|---|---|---|---|
| 4,984,927 | 1/1991 | Kojima et al. | 228/122 |
| 4,988,034 | 1/1991 | Taniguchi et al. | 228/122 |
| 5,009,357 | 4/1991 | Baker et al. | 228/122 |
| 5,161,908 | 11/1992 | Yoshida et al. | 228/124 |
| 5,163,770 | 11/1992 | Soma et al. | 228/124 |

FOREIGN PATENT DOCUMENTS

| | | | |
|---|---|---|---|
| 0195640 | 9/1986 | European Pat. Off. | 228/124.7 |
| 3632614 | 4/1987 | Fed. Rep. of Germany | 228/124.7 |
| 3924225 | 1/1990 | Fed. Rep. of Germany | . |
| 3924591 | 2/1990 | Fed. Rep. of Germany | 228/124.7 |
| 60-082267 | 5/1985 | Japan | 228/124.7 |
| 60-260481 | 12/1985 | Japan | 228/124.7 |
| 60-260482 | 12/1985 | Japan | 228/124.7 |
| 61-219766 | 9/1986 | Japan | 228/124.7 |

*Primary Examiner*—Samuel M. Heinrich
*Attorney, Agent, or Firm*—Foley & Lardner

[57] ABSTRACT

A method for joining a ceramic component to a metal component by brazing where the outer edge of the joining surface on the ceramic component (1) is provided with a chamfer (3) with a chamfer angle ($\alpha$) of 15°–45°. The chamfer (3) has an edge radius of $\leq 0.3$ mm and its minimum height (H) is to be 5–30% of the wall thickness (W) of the ceramic component (1). The joining surface, including its chamfer, is provided with a metallizing layer.

7 Claims, 1 Drawing Sheet

METHOD OF JOINING A CERAMIC COMPONENT TO A METAL COMPONENT

The benefit is hereby claimed of the right to earlier filing date based on PCT/EP91/01206 as provided for in 35 U.S.C. §120.

BACKGROUND OF THE INVENTION

The invention relates to a method of joining a ceramic component to a metal component by brazing, and to the composite so produced.

Conventional brazed joints have the disadvantage that stress cracks arise in the ceramic during the cooling phase after the brazing.

SUMMARY OF THE INVENTION

An object of the invention is to provide a solution to the foregoing problem. The foregoing object, and other objects appreciated by those skilled in the art, are achieved by the special configuration of the joining surface of the ceramic, which is characterized in that the outer edge of the joining surface of the ceramic component is provided with a chamfer whose chamfer angle is from about 15° to 45° the chamfer having an edge radius of about $\leq 0.3$ mm and its minimum height being from about 5 to 30% of the wall thickness of the ceramic component.

According to one aspect of the present invention, there has been provided a method of joining a ceramic component along a joining surface thereof to a metal component comprising the steps of:

providing a ceramic component having a joining surface provided with a metallizing layer, and having the outer peripheral edge of the joining surface of the ceramic component provided with a chamfer whose chamfer angle ($\alpha$) is from about 15° to about 45° the chamfer having an edge radius of $\leq$ about 0.3 mm and its minimum height being from about 5 to about 30% of the wall thickness of the ceramic component;

positioning a metal component adjacent to the joining surface of the ceramic component; and brazing the metal component to the ceramic component at the joining surface.

In accordance with another aspect of the invention, there has been provided a composite article comprising a ceramic component provided with a metallizing layer joined to a metal component by brazing at a joining surface of the ceramic component, wherein the outer peripheral edge of the joining surface of the ceramic component is provided with a chamfer whose chamfer angle ($\alpha$) is from about 15° to about 45° the chamfer having an edge radius of $\leq$ about 0.3 mm and its minimum height being about 5 to about 30% of the wall thickness of the ceramic component.

The advantages of the invention are basically to be seen in the fact that stress cracks in the ceramic are avoided and the bonding strength is improved.

Further objects, features and advantages of the present invention will become apparent from the detailed description of preferred embodiments that follows, when considered together with the attached figures of drawing.

BRIEF DESCRIPTION OF THE DRAWINGS

The invention is described in more detail hereinafter with the said of the drawings, which only illustrate one embodiment and in which.

DETAILED DESCRIPTION OF THE PREFERRED EMBODIMENTS

Figure 1:
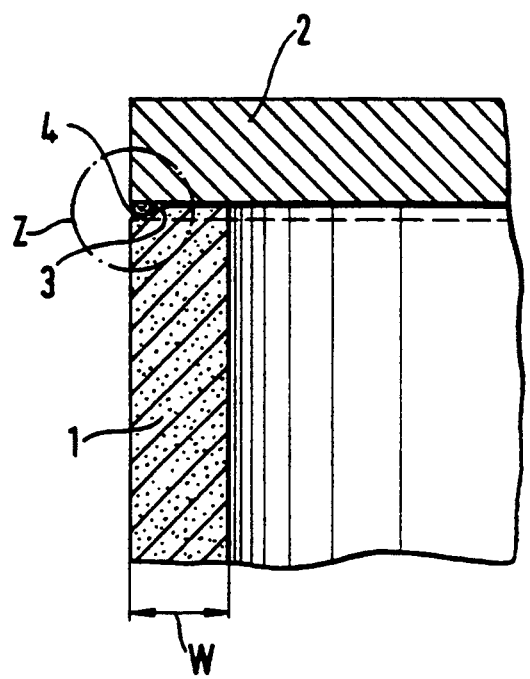
FIG. 1 shows a section through a joint between a ceramic ring and metal plate.
Figure 2:
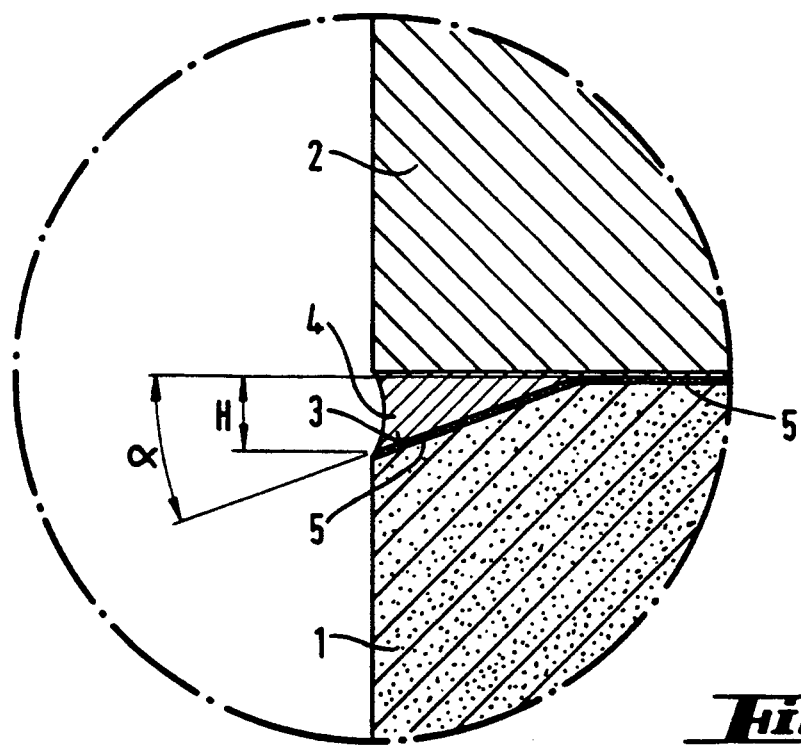
FIG. 2 shows the detail "Z" of FIG. 1.

In accordance with the invention, the ceramic ring 1 is provided with a chamfer 3 whose chamfer angle $\alpha$ may be 15° to 45° preferably about 30°. The chamfer 3 may preferably be provided with a nickel layer 5 that is 1 to 6 $\mu$m thick, in addition to the metallizing layer 6 of molybdenum/manganese or tungsten, whose thickness is generally between 5 and 20 $\mu$m. As illustrated in FIG. 2, the metallizing layer 6 is disposed between nickel layer 5 and ceramic ring 1. The metal plate 2 of, for example, copper is joined by means of brazing solder 4 to the ceramic ring 1. The minimum height H of the chamfer 3 should be about 0.1 mm, and typically is from about 5 to 30% of the wall thickness W of the ceramic ring 1. Composites of said type are used for electrical components. The novel method of joining a ceramic component to a metal component is suitable for both area brazing and line brazing.

The chamfer angle is preferably 30°. The chamfer can be galled and may have a nickel layer 1 to 6 $\mu$m thick in addition to the usual metallizing layer of molybdenum/manganese or tungsten.

The present invention has been described in detail with reference to preferred embodiments. Those skilled in the art readily recognize that various modifications may be made to the invention without departing from the spirit and scope thereof.

What is claimed is:

1. A method of joining a ceramic component along a joining surface thereof to a metal component comprising the steps of:

providing a ceramic component having a joining surface provided with a metallizing layer, and having the outer peripheral edge of the joining surface of the ceramic component provided with a chamfer whose chamfer angle ($\epsilon$) is from about 15° to about 45°, the chamfer having an edge radius of $\leq$ about 0.3 mm and its minimum height being from about 5 to about 30% of a wall thickness of the ceramic component;

positioning a metal component adjacent to the joining surface of the ceramic component; and brazing the metal component to the ceramic component at the joining surface.

2. A method of joining according to claim 1, wherein the chamfer angle ($\alpha$) is about 30°.

3. A method of joining according to claim 1, wherein the chamfer is galled.

4. A method of joining according to claim 1, wherein the chamfer has a nickel layer that is about 1 to about 6 $\mu$m thick.

5. A method of joining according to claim 1, wherein said metallizing layer comprises a metal selected from the group consisting of one or more of molybdenum, manganese and tungsten.

6. A method of joining according to claim 5, wherein said metallizing layer is an alloy of molybdenum and manganese.

7. A method of joining according to claim 5, wherein said metallizing layer is about 5 to about 20 $\mu$m thick.

* * * * *